United States Patent
Demange et al.

(10) Patent No.: US 9,405,338 B2
(45) Date of Patent: Aug. 2, 2016

(54) HEAT SINK FOR AN INTERCHANGEABLE EXPANSION MODULE CAPABLE OF BEING CONNECTED TO A COMPUTER BOARD

(75) Inventors: Fabien Demange, Poissy (FR); Nicolas Depret, Versailles (FR)

(73) Assignee: BULL SAS, Les Clayes sous Bois (FR)

( * ) Notice: Subject to any disclaimer, the term of this patent is extended or adjusted under 35 U.S.C. 154(b) by 290 days.

(21) Appl. No.: 13/824,941

(22) PCT Filed: Sep. 28, 2011

(86) PCT No.: PCT/FR2011/052265
§ 371 (c)(1),
(2), (4) Date: Mar. 18, 2013

(87) PCT Pub. No.: WO2012/049395
PCT Pub. Date: Apr. 19, 2012

(65) Prior Publication Data
US 2013/0182389 A1    Jul. 18, 2013

(30) Foreign Application Priority Data

Oct. 13, 2010 (FR) ...................................... 10 58352

(51) Int. Cl.
*H05K 7/20* (2006.01)
*G06F 1/20* (2006.01)
*H01L 23/473* (2006.01)

(52) U.S. Cl.
CPC *G06F 1/206* (2013.01); *G06F 1/20* (2013.01); *G06F 2200/201* (2013.01)

(58) Field of Classification Search
CPC ............ H05K 7/20218–7/20381; H05K 7/20409–7/20418; H05K 7/20009–7/202; H01L 23/46–23/3677; F28F 3/02; F28F 13/06–13/125; G06F 1/181–1/182
USPC ........... 361/676–678, 679.46–679.54, 361/688–723; 165/80.1–80.5, 104.33, 185; 174/15.1–15.3, 16.1–16.3, 547, 548; 257/712–722, E23.088; 24/453, 24/458–459; 454/184; 312/236
See application file for complete search history.

(56) References Cited

U.S. PATENT DOCUMENTS 6,201,695 B1 * 3/2001 Duesman et al. ............. 361/703
6,922,338 B2 * 7/2005 Poechmueller ............... 361/719
(Continued)

FOREIGN PATENT DOCUMENTS

JP          3086946 U    7/2002
JP     2006-053914 A    2/2006
(Continued)

OTHER PUBLICATIONS

PCT, International Search Report, for International Application No. PCT/FR2011/052265, dated Jan. 11, 2012.
(Continued)

*Primary Examiner* — Anthony Haughton
*Assistant Examiner* — Razmeen Gafur
(74) *Attorney, Agent, or Firm* — Pillsbury Winthrop Shaw Pittman LLP

(57) ABSTRACT

A heat sink for an interchangeable expansion module that can be connected to a computer board is disclosed. In one aspect, the heat sink has at least one cooling module in which a coolant flows, and at least one first electrical connector. The heat sink, wherein the expansion module has at least one second electrical connector configured to be connected to the first electrical connector of the board, and has at least one heat exchange surface, the heat sink comprising at least one heat-transfer device configured to be removably placed against the exchange surface, and the heat-transfer device further being configured such that it is in thermal contact with the cooling module and is mechanically attached, in a removable manner, to the cooling module of the board when the expansion module is connected to the board is also disclosed.

17 Claims, 5 Drawing Sheets

(56) References Cited

U.S. PATENT DOCUMENTS

| | | | |
|---|---|---|---|
| 7,349,220 B2* | 3/2008 | Lai | H01L 23/4093 165/185 |
| 7,391,613 B2* | 6/2008 | Lai | H01L 23/3672 165/104.26 |
| 7,447,024 B1* | 11/2008 | Chou | 361/695 |
| 7,457,122 B2* | 11/2008 | Lai | G11C 5/143 257/707 |
| 7,579,687 B2* | 8/2009 | Szewerenko et al. | 257/707 |
| 7,609,523 B1* | 10/2009 | Ni | H01L 23/3672 257/707 |
| 7,688,592 B2* | 3/2010 | Gruendler | H01L 23/4093 165/185 |
| 7,715,197 B2* | 5/2010 | Tian et al. | 361/719 |
| 7,768,785 B2* | 8/2010 | Ni | H01L 23/367 257/707 |
| 7,957,134 B2* | 6/2011 | Farnsworth | H01L 23/4093 257/719 |
| 7,957,141 B2* | 6/2011 | Chou | H01L 23/40 165/122 |
| 8,004,841 B2* | 8/2011 | Cipolla | F28D 15/0233 165/104.33 |
| 8,027,162 B2* | 9/2011 | Campbell | H05K 7/2079 165/104.33 |
| 8,059,406 B1* | 11/2011 | Meyer et al. | 361/701 |
| 8,111,516 B2* | 2/2012 | Goldrian | H05K 7/20545 165/80.1 |
| 8,134,834 B2* | 3/2012 | Meyer, IV | F28D 15/0233 165/104.26 |
| 8,599,557 B2* | 12/2013 | Peterson | G06F 1/20 165/104.21 |
| 8,638,559 B2* | 1/2014 | Barina | H01L 23/4093 165/104.21 |
| 2006/0056154 A1* | 3/2006 | Foster, Sr. | G06F 1/185 361/700 |
| 2006/0067054 A1* | 3/2006 | Wang et al. | 361/704 |
| 2007/0206359 A1* | 9/2007 | Lai et al. | 361/715 |
| 2007/0223198 A1* | 9/2007 | Lai et al. | 361/720 |
| 2007/0263353 A1* | 11/2007 | McGuff | G06F 1/185 361/688 |
| 2007/0263359 A1* | 11/2007 | Lai | H01L 23/3672 361/715 |
| 2007/0263360 A1* | 11/2007 | Lai | H01L 23/4093 361/719 |
| 2007/0263361 A1* | 11/2007 | Lai | H01L 23/4093 361/719 |
| 2008/0013282 A1 | 1/2008 | Hoss et al. | |
| 2008/0074848 A1* | 3/2008 | Park | H01L 23/4093 361/718 |
| 2008/0174965 A1 | 7/2008 | Hus | |
| 2008/0251911 A1* | 10/2008 | Farnsworth | H01L 23/4093 257/714 |
| 2008/0266807 A1* | 10/2008 | Lakin | H05K 7/20409 361/709 |
| 2009/0109613 A1* | 4/2009 | Legen | G06F 1/20 361/679.54 |
| 2009/0168356 A1* | 7/2009 | Chen | H01L 23/427 361/709 |
| 2009/0277616 A1* | 11/2009 | Cipolla | F28D 15/0233 165/104.33 |
| 2009/0284928 A1* | 11/2009 | Eckberg | H01L 23/3672 361/707 |
| 2009/0290301 A1* | 11/2009 | Legen | H01L 23/3672 361/679.54 |
| 2009/0303679 A1* | 12/2009 | Chen | G06F 1/20 361/679.49 |
| 2009/0309214 A1* | 12/2009 | Szewerenko et al. | 257/707 |
| 2009/0316352 A1* | 12/2009 | Zhu | G11C 5/04 361/679.54 |
| 2010/0085712 A1 | 4/2010 | Hrehor, Jr. et al. | |

FOREIGN PATENT DOCUMENTS

| | | |
|---|---|---|
| JP | 2010-040886 A | 2/2010 |
| WO | WO 2010/126499 A1 | 11/2010 |

OTHER PUBLICATIONS

Non-Final Office Action as issued in Japanese Patent Application No. 2013-533253, dated Jun. 30, 2015.

* cited by examiner

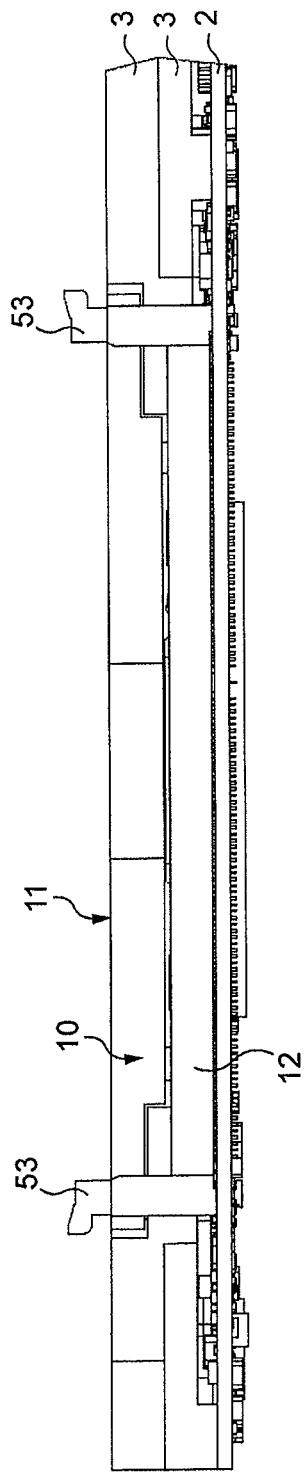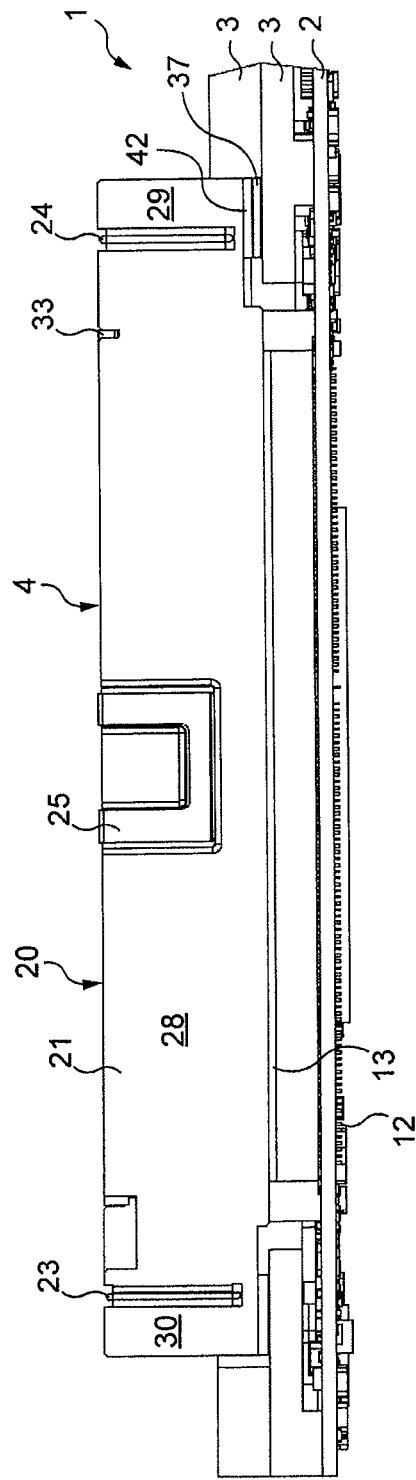

HEAT SINK FOR AN INTERCHANGEABLE EXPANSION MODULE CAPABLE OF BEING CONNECTED TO A COMPUTER BOARD

The invention concerns a heat sink for an interchangeable expansion module capable of being connected to a computer board.

The invention also concerns a computer board comprising at least one interchangeable expansion module and at least one heat sink associated with said at least one interchangeable expansion module.

In the field of computer systems in general, systems are known having an architecture based on computer boards, also called blades inserted into cases, the cases also being called racks. Each computer board bears a certain number of computer components such as interchangeable expansion modules such as memory modules and/or input/output interfaces such as a network card.

As these interchangeable expansion modules are provided with electronic components which heat up in operation, these modules need to be cooled to ensure their proper operation and their durability.

One solution proposed by some manufacturers of interchangeable expansion modules is to arrange on each of those modules a so-called integrated air-cooled heat sink, rather than to provide bare modules, that is to say without any integrated heat sink. The problem is that these integrated air-cooled heat sinks require to be in an environment with forced air convention, and, furthermore, they may be insufficient for the cooling of those modules.

Solutions are also known in which liquid-cooled heat sinks are arranged around interchangeable expansion modules, those heat sinks for the most part being mounted permanently on the modules and furthermore having inlet and outlet conduits for the cooling liquid, which conduits are arranged on an upper edge of the expansion modules. The problem with these liquid-cooled heat sinks is that they are, in particular on account of the inlet and outlet conduits, bulkier than the modules. Consequently, the assembly formed by one of those modules and by the liquid-cooled heat sink associated therewith is of a size, and in particular of a height, that does not comply with the compactness constraints which, in the field of computer systems, are increasingly severe.

It is furthermore known that in a batch of interchangeable expansion modules, it is frequent, or even routine, for a certain number of modules not to operate once connected to the computer boards. The case arising, those modules, referred to as reject modules, may be sent back to their manufacturer, since they are generally under guarantee. Yet, where those modules are associated with air- or liquid-cooled heat sinks that are permanently mounted on those associated modules, returning them is impossible since they are no longer in the same configuration as at the time of their delivery. This therefore poses problems of maintainability.

There is thus a need to provide a heat sink for an interchangeable expansion module which provides good performance, is of small bulk and which enables the interchangeable expansion module to be sent back to its manufacturer in case of malfunction, in particular when it is still under guarantee.

According to a first aspect, the invention thus relates to a heat sink for an interchangeable expansion module able to be connected to a computer board, said board having at least one cooling module in which passes a cooling fluid and at least one first electrical connector, said expansion module having at least one second electrical connector configured to be connected to said at least one first electrical connector of said board and at least one heat exchange surface, said heat sink comprising at least one heat-transfer device configured to be placed removably against said exchange surface of said expansion module, which at least one said device is furthermore configured such that it is in thermal contact with said cooling module of said board and is removably fastened mechanically to said cooling module of said board when said expansion module is connected to said board.

As the heat-transfer device of the heat sink according to the invention is adapted to be placed against the exchange surface of the interchangeable expansion module, it enables the capture of a high quantity of heat produced by electronic components of that expansion module at that exchange surface. Furthermore, since that heat-transfer device is adapted to be in thermal contact with the cooling module of the computer board when the expansion module is itself connected to that board, the heat captured by the heat-transfer device may be transferred to the cooling module of the computer board via that heat transfer device. Thus, the heat-transfer device of the heat sink according to the invention provides particularly good performance and may suffice of itself to ensure the cooling of the expansion module, in order to assure high durability for that module.

Furthermore, the fact that the heat-transfer device of the heat sink according to the invention is adapted to be placed against said exchange surface and is adapted to be in thermal contact with the cooling module of the computer board enables that heat sink not to need a system for passing a cooling liquid all around the expansion module, contrary to some solutions of the state of the art. Thus, the problems of bulk that are linked for example to the inlet and outlet conduits for a liquid of the known solutions are avoided.

It is also to be observed that the heat-transfer device of the heat sink according to the invention is adapted to be removably placed against the exchange surface of the expansion module and also to be removably fastened to the computer board. Due to this, the heat sink according to the invention, which is adapted to be associated with at least one expansion module, is fully demountable, in other words removable, in relation both to the expansion module and to the computer board. In this way, if it is noticed that the interchangeable expansion module, once connected to the computer board, does not function, it may easily be returned to its original configuration (either bare, or with an integrated air-cooled heat sink) and thus be sent back to its manufacturer under guarantee.

The heat sink according to the invention thus enables both efficient cooling of the interchangeable expansion module or modules with which it is adapted to be associated, in a bulk respecting compactness constraints while at the same time providing a particularly convenient and economic level of maintainability.

Preferably, the heat sink according to the invention further comprises a thermal interface sandwiched between said heat-transfer device and said heat exchange surface of said expansion module. This thermal interface, which may be of a shape adapted to the heat-transfer device or to the interchangeable expansion module, enables heat transfer from the electronic components of the expansion module to the heat-transfer device with still better performance.

According to a particularly preferred example embodiment of the invention, the heat sink comprises two said heat-transfer devices configured to sandwich at least one said interchangeable expansion module, one of the two said heat-transfer devices being configured to be removably placed against a said exchange surface of a said at least one expansion module or in thermal contact with said cooling module of said board and removably fastened mechanically to said board when said at least one expansion module is connected to said board, and the other of the two said heat-transfer devices being configured to be in thermal contact with said cooling module of said board and removably fastened mechanically to said board when said at least one expansion module is connected to said board or removably placed against a said exchange surface of a said at least one expansion module.

It is to be noted that one or more interchangeable expansion modules may be sandwiched between the two heat-transfer devices of the heat sink.

According to a preferred simple, convenient and economical feature of the heat sink according to the invention, the heat sink comprises two said heat-transfer devices and linking parts configured such that the two said heat-transfer devices are situated at a predetermined constant distance from each other.

Thus, the two heat-transfer devices are standard, that is to say that they may sandwich one or more interchangeable expansion modules, which may have different sizes, and in particular different thicknesses. Between those two heat-transfer devices, there may also be an interchangeable expansion module of a particular type, for example bare, or an interchangeable expansion module of another type, for example with an integrated air-cooled heat sink. The variation in size, and in particular in thickness, is compensated for in particular by the size, and in particular the thickness, of the thermal interface disposed between the heat-transfer device and the heat exchange surface.

According to a preferred feature which makes it possible in particular for the heat sink according to the invention to have minimum bulk in order to comply with the compactness constraints, said at least one heat-transfer device is of a predetermined height less than or equal to the height of said expansion module.

According to still other preferred, simple, convenient and economical features of the heat sink according to the invention:
  the heat sink comprises two said heat-transfer devices and positioning means configured to form a space adapted to receive at least one said expansion module, said space having a delimited contour formed at least partially by the two said heat-transfer devices and by said positioning means;
  the heat sink comprises two said heat-transfer devices configured to be arranged facing each other, which said two heat-transfer devices are identical; and
  the heat sink comprises two said heat-transfer devices each provided with at least one linking lug, which linking lugs are configured to be linked together, in thermal contact with said cooling module and removably fastened mechanically together to said computer board when said at least one expansion module is connected to said board, at least one of said linking lugs being configured to be placed against said cooling module.

According to a second aspect, the invention aims to provide a computer board comprising at least one cooling module in which passes a cooling fluid, at least one first electrical connector, at least one interchangeable expansion module having at least one second electrical connector configured to be connected to said at least one first electrical connector of said board, and at least one heat sink as described above.

According to a preferred simple, convenient and economical feature of the board according to the invention, the board comprises at least one third electrical connector, at least one processor having at least one fourth electrical connector configured to be connected to said at least one third electrical connector of said board and at least one heat exchange surface; and at least one other heat sink dedicated to said at least one processor, said at least one other heat sink being configured to be at the same time placed removably against the heat exchange surface of said processor, in thermal contact with said cooling module and removably fastened mechanically to said board when said at least one processor is connected to said board.

Thus, the computer board according to the invention comprises not only heat sinks dedicated to the interchangeable expansion modules of the computer board but also other heat sinks dedicated to the processors of that same board. Each of those heat sinks is removable relative to the component with which it is associated (interchangeable expansion module or processor) in order to make the maintainability possible in a simple way.

The disclosure of the invention will now be continued with the description of embodiments, given below by way of illustrative and non-limiting examples, with reference to the accompanying drawings, in which:

FIGS. 5 and 6 are partial plan views of the computer board respectively without any interchangeable expansion module and with an interchangeable expansion module connected to that board;

Figure 8:
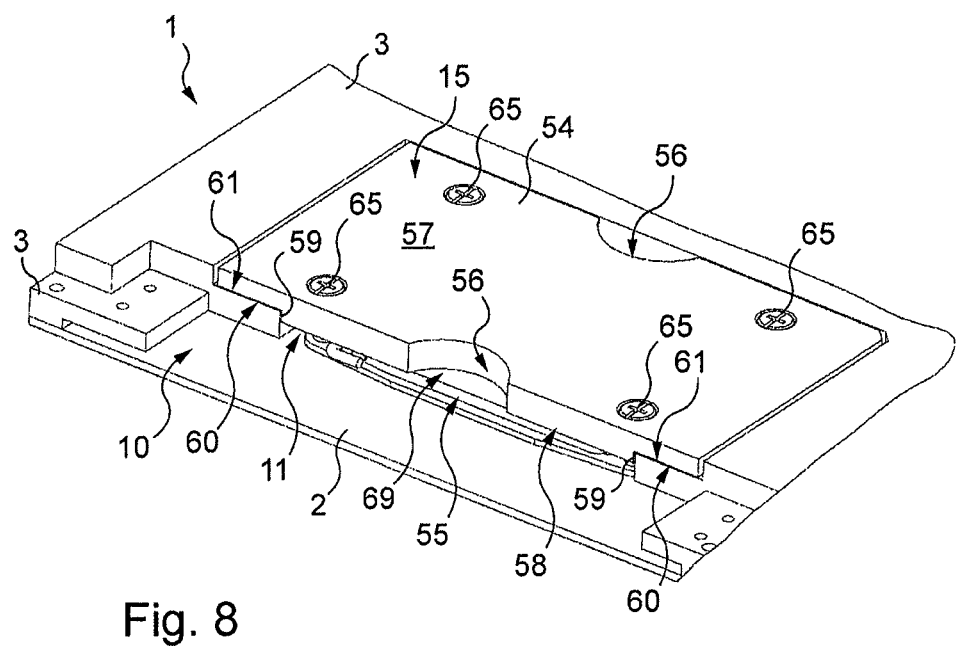
Figure 9:
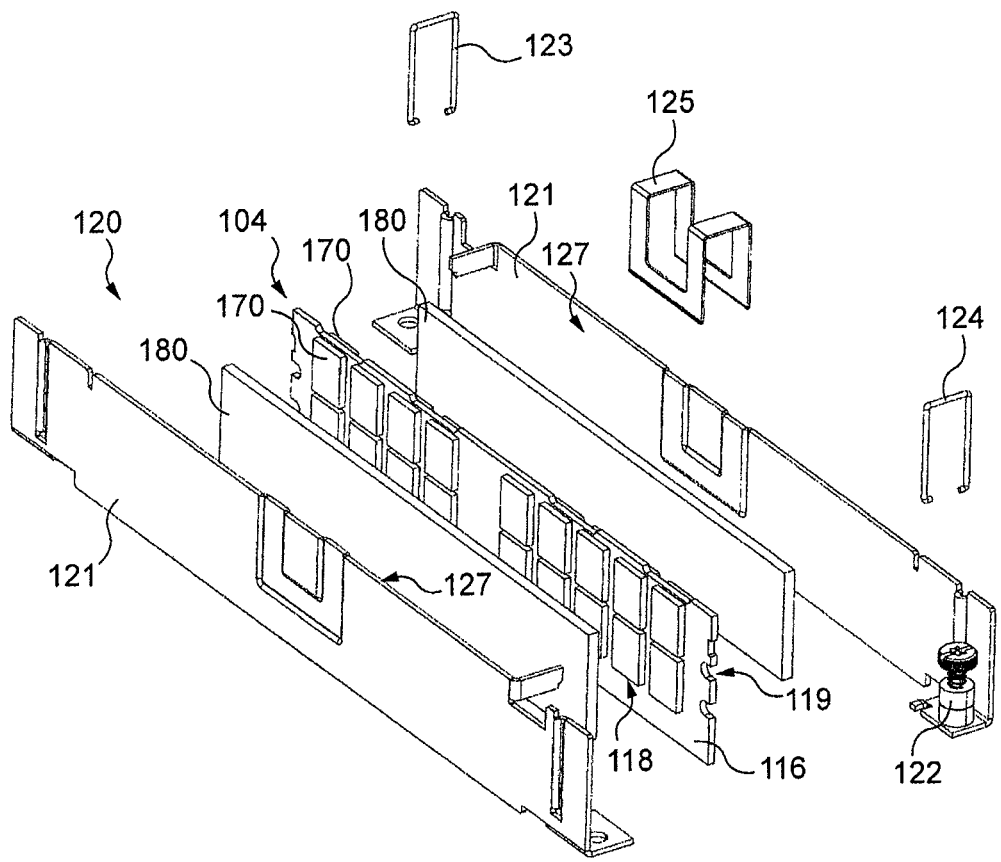
Figure 10:
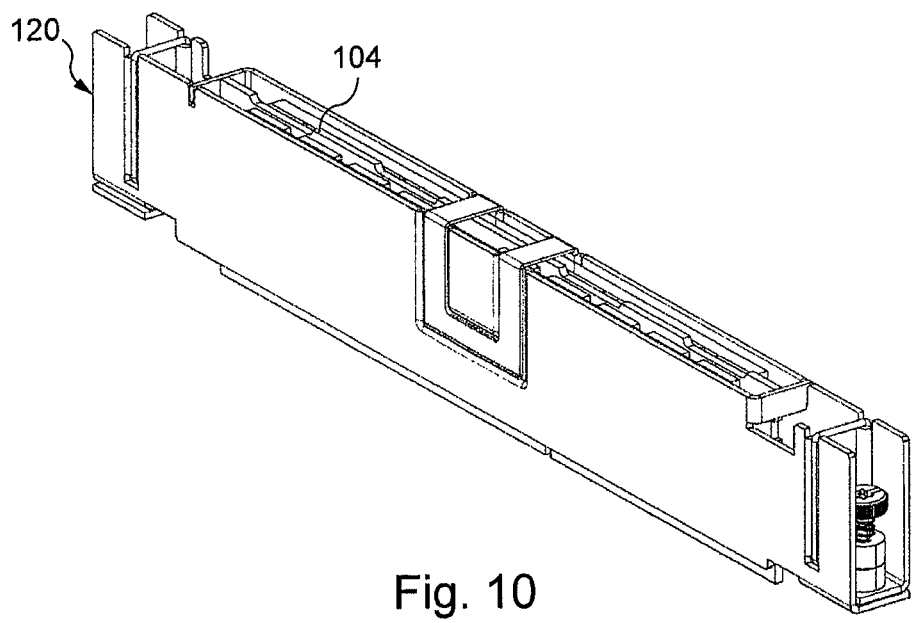

FIG. 8 is a partial view in perspective of the computer board, without any interchangeable expansion module, and with the processor connected to the board and the heat sink associated with that processor; and FIGS. 9 and 10 are perspective views of a heat sink associated with another interchangeable expansion module according to a second embodiment of the invention, respectively in an unassembled state and in an assemble state.

Figure 1:
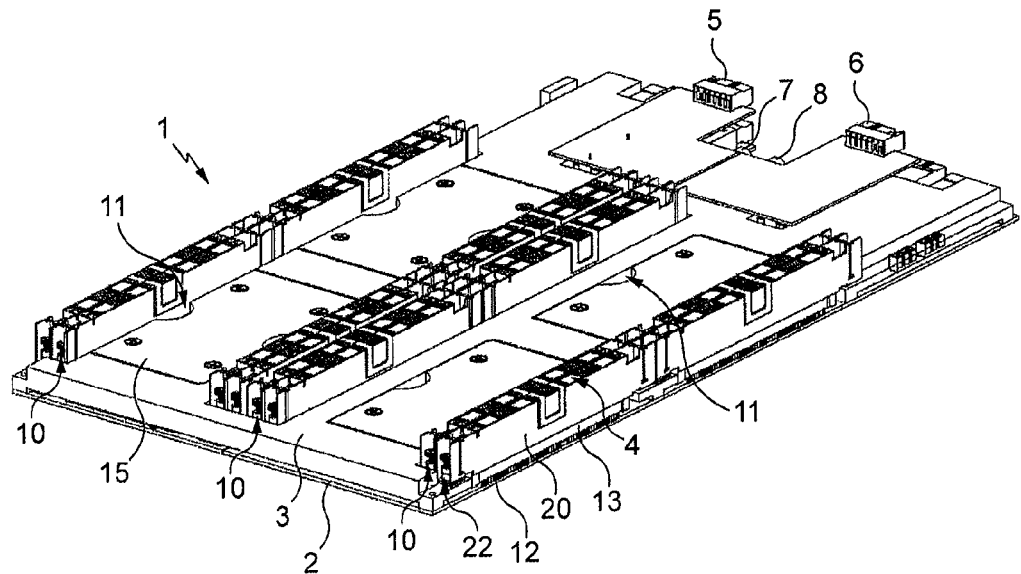
FIG. 1 is a perspective view of a computer board according to a first embodiment of the invention.

As can be seen more particularly in FIG. 1, a computer board 1 according to the invention, also called a blade, for a computer system, is dimensioned to be inserted into a computer system case (not shown).

This computer board 1 comprises a printed circuit 2, a cooling module 3 having the general shape of a plate extending over a major part of the printed circuit 2 and components formed here by interchangeable expansion modules, and in particular memory modules 4, and processors (not visible in this Figure).

The computer board 1 further comprises two electrical connectors 5 and 6 disposed on one side of that board 1. These electrical connectors 5 and 6 are adapted to cooperate with complementary electrical connectors disposed in the computer system case (which are not shown) to provide the electrical connection.

The cooling module, also called cold plate 3, is securely mounted on the printed circuit 2 and comprises channels (not shown) for passage of a liquid or gaseous cooling fluid which are open to inlet and outlet conduits 7 and 8 respectively for the inlet and outlet of the cooling fluid, which fluid is adapted to flow in the channels of that cold plate 3 for the cooling of both the printed circuit 2 and of the components that are connected thereto.

The cold plate 3 furthermore has openings 10 and 11 passing through its thickness such that those openings 10 and 11 open on both sides of that cold plate 3.

The openings 10 are situated at the contour and in a central position of the cold plate 3 and are adapted to receive the memory modules 4 for them to be put in place on the printed circuit 2.

The openings 11 of the cold plate 3 are disposed between the openings 10 which are located at the contour of that cold plate 3 and the openings 10 which are on the contrary central and are adapted to receive the processors for them to be put in place on the printed circuit 2.

The printed circuit 2 comprises electrical connectors 12 which are adapted to be electrically connected to the memory modules 4 via connecting lugs 13 of those modules 4.

The computer board 1 further comprises heat sinks 20 each associated with a memory module 4, as well as heat sinks 15 each associated with a processor 55 (which can be seen in FIG. 8).

Figure 2:
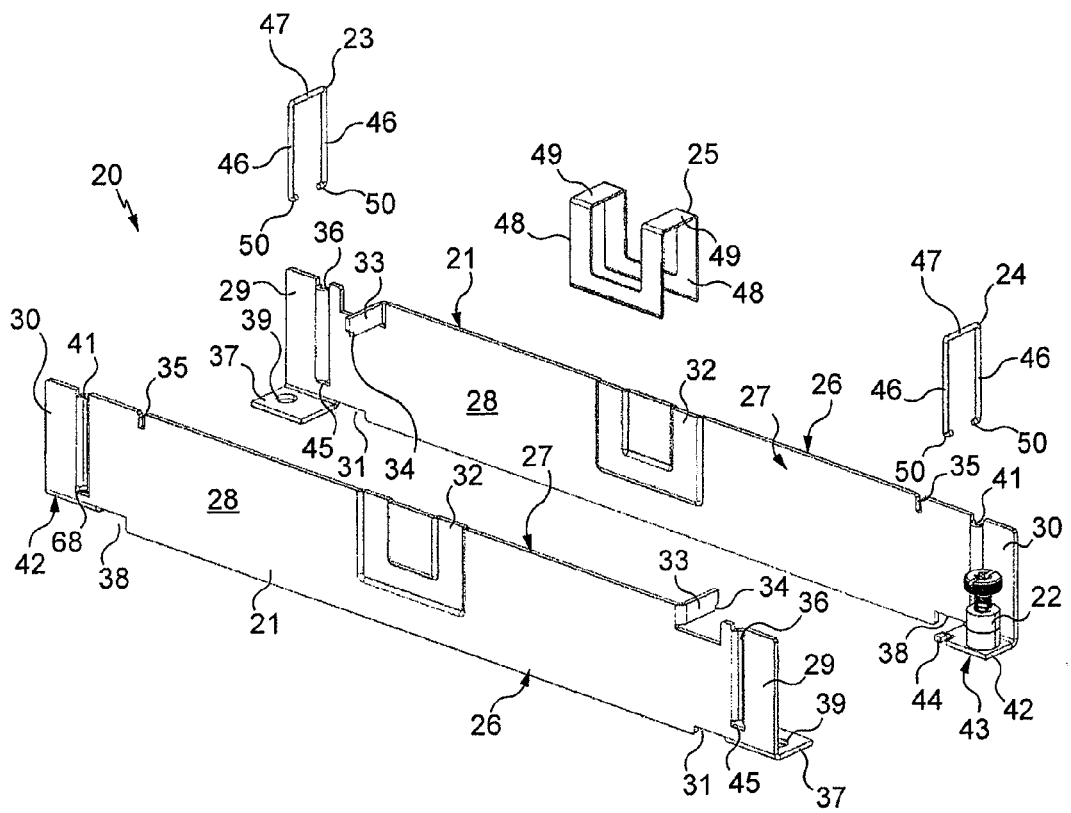
FIG. 2 is a perspective view showing partially and in isolation a heat sink for an interchangeable expansion module connected to the computer board.

FIG. 2 illustrates the heat sink 20 associated with the memory module 4.

This heat sink 20 is provided with two lateral metal heat transfer plates 21; with two fastening means 22 (only one of which is visible in FIG. 2) for fastening those metal plates 21 to the cold plate 3 and with three linking parts 23 to 25 for linking the two metal plates 21 together.

The heat transfer plates 21 are here of copper and are formed as a single piece.

The heat transfer plates 21 are each of a rectangular general shape with an outside face 26 and an inside face 27.

These heat transfer metal plates 21 each have a first portion 28 here forming the major part of that plate and second and third portions respectively 29 and 30 extending the first portions 28 at their ends.

Each heat transfer plate 21 has re-entrant portions 31 and 38 on a lower edge of that heat transfer plate 21 at the location of the connections between the first portions 28 and the respective portions 29 and 30.

Each first portion 28 is furthermore provided with a deformation 32 formed for example by press forming of those first portions 28 of the heat transfer plates 21.

These deformations 32 are formed substantially in the center along the length of those first portions 28 and have the shape of a U which is open to an upper edge of those heat transfer plates 21.

More specifically, these deformations are formed in such a manner that they form a hollow on the outside face 26 of each plate 21 and a boss on the inside face 27 of each plate 21.

The first portions 28 also comprise protrusions 33 forming parts for linking the plates 21 and means for positioning the memory module 4 between those plates 21.

These protrusions 33 are at the location of the upper edge of each plate 21 and in the vicinity of each second portion 29. These protrusions 33 are formed by an L-shaped cut-out of predetermined length from each heat transfer plate 21, those protrusions then being bent to be situated in a direction that is perpendicular relative to the general direction of each heat transfer plate 21.

Furthermore, the protrusions 33 have a notch 34 at their free end.

Each first portion 28 is also provided with a slot 35 formed on the upper edge of each heat transfer plate 21 in the vicinity of each third portion 30.

These slots are formed such that they are able to receive the end of a protrusion 33 located opposite, the bottom of each cut-out 35 serving to support an edge of a respective protrusion 33, which edge is formed on account of the respective notch 34.

Each second portion 29 is provided with a groove 36 extending transversely relative to the general direction of the heat transfer plates 21, that groove being open both to the upper edge of each plate 21 and to holes 45 formed in the second portions 29.

Each second portion 29 furthermore has a linking lug 37 having an aperture 39 at its center. Each lug 37 forms an extension of the respective second portion 29, that extension extending horizontally and perpendicularly relative to the general direction of each heat transfer plate 21.

The third portions 30 are each provided with a groove 41 similar to the grooves 36 formed on the third portions 30, that is to say which is open both to the upper edge of each plate 21 and to holes 68 formed in the third portions 30.

The third portions 30 are each furthermore provided with a linking lug 42 having an aperture 43 at its center, those lugs 42 being similar to the linking lugs 37 which extend from the second portions 29, the only difference being that each lug 42 further comprises a stop-forming projection 44.

The linking lugs 37 and 42 formed on each heat transfer plate 21 are offset in a horizontal plan thanks to the fact that the re-entrant portions 31 and 38 are not identical. To be precise, re-entrant portion 38 is larger than re-entrant portion 31 such that the linking lug 42 of each plate 21 is in a first horizontal plane which is located above a second horizontal plane in which is located the linking lug 37 of each plate 21.

The fastening means 22 are formed by known captive spring screws which are provided with a head, a shank which extends from the head, a sleeve in which is received the shank and a spring interposed between the head and the sleeve and arranged around the shank. These fastening screws 22 are adapted to be disposed on the linking lugs 42, which are adapted, as will be seen below in more detail, to be supported by a linking lug 37 of a facing heat transfer plate 21, the linking lugs 37 being located below the linking lugs 42 and the apertures 39 and 43 being centered.

The linking parts 23 and 24 are identical and take the form of rectangular circlips with three branches of which two branches 46 are adapted to be inserted into the grooves 36 and 41 of the respective second and third portions 29 and 30, the other branch 47 meeting the two branches 46 at the location of the upper edges of the plates 21 as will be seen in more detail below. Those circlips 23 furthermore have two tips 50 at the free ends of the branches 46, those tips 50 being adapted to be held in the holes 45 and 68 of the respective second and third portions 29 and 30 of two plates 21 facing each other.

The linking part 25, which is central, has two U-shaped branches 48 and two other branches 49 meeting pairs of the upper ends of the two branches 48. As will be seen later in more detail, this linking part 25 is adapted to be inserted into the deformations 32 of two heat transfer plates 21.

The linking parts 23, 24 and 25 have substantially identical spacing such that the heat sink presents a constant predetermined distance between each plate 21 once the heat sink 20 has been associated with the memory module 4.

Figure 3:
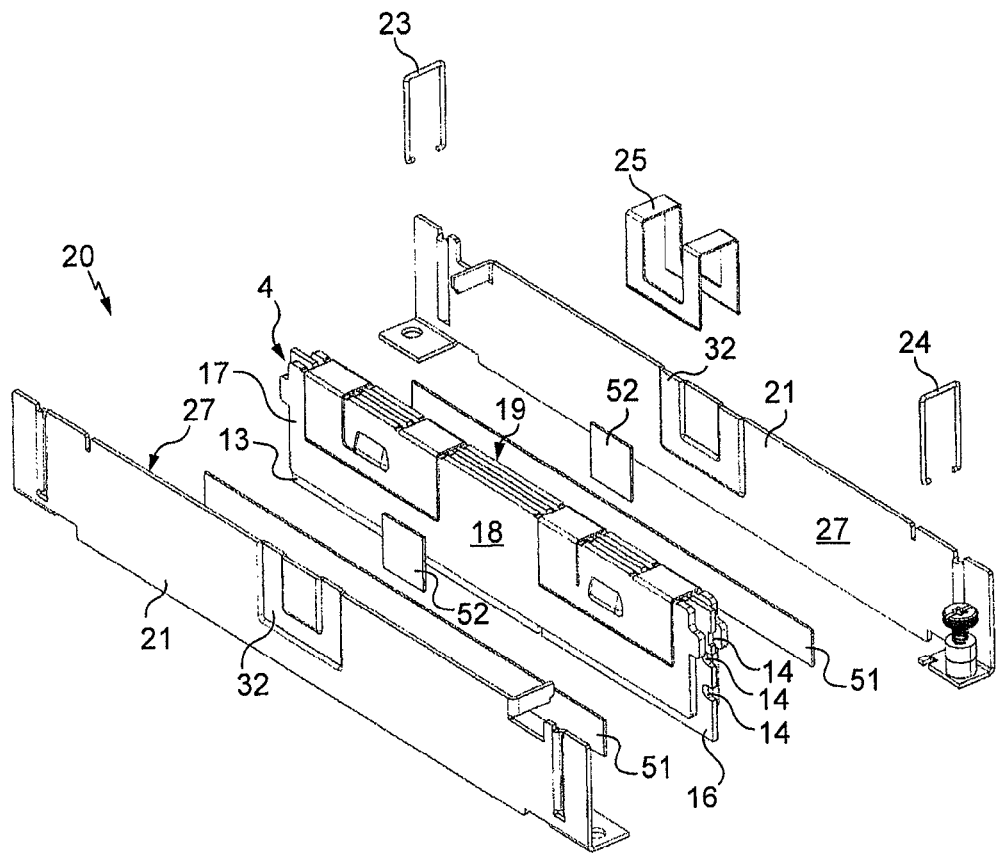
FIGS. 3 and 4 are perspective views of the heat sink associated with an interchangeable expansion module, respectively in an unassembled state and in an assembled state.

FIG. 3 illustrates the heat sink 20 in its entirety and a memory module 4, the two being in an unassembled state.

The memory module 4 is provided with a circuit 16 on which there are implanted electronic components, at least on one of those lateral faces.

The module represented in FIG. 3 is furthermore provided with an integrated air-cooled heat sink 17 which at least partially envelopes that circuit 16.

This memory module 4 is delivered by its manufacturer in the state represented in FIG. 3.

As the electronic components that are mounted on that memory module 4 heat up in operation, the memory module 4 has two opposite heat exchange surfaces 18 and 19.

The memory module 4 comprises retaining means 14 thereof on the printed circuit 2 as will be described in more detail in FIG. 6.

The heat sink 20 comprises, in addition to the parts described in FIG. 2, thermal interfaces 51 and 52 each formed from a block of flexible thermally conductive putty, which putty is at least partially hardened to substantially retain its starting shape while remaining compressible.

The blocks 51 of thermally conductive putty are of rectangular shape and are adapted to be sandwiched between, respectively, a lower part of the heat exchange surface 18 of the memory module 4 and an upper part of the inside face 27 of a heat transfer plate 21, and a lower part of the heat exchange surface 19 of the memory module 4 and a lower part of the inside face of another heat transfer plate 21.

In the same way, the respective blocks of thermally conductive putty 52 are of square type rectangular shape and are adapted to be sandwiched between, respectively, an upper part of the heat exchange surface 18 of the memory module 4 and an upper part of the inside face of the plate 21, the latter upper part being located in reality wedged in the U-shaped deformation 32, and an upper part of the heat exchange surface 19 of the memory module 4 and an upper part of the inside face 27 of the other plate 21, the latter upper part being located in reality wedged in the U-shaped deformation 32 of that plate 21.

Both plates 21 of FIG. 3 are thus brought towards each other until they sandwich the memory module 4 and the respective blocks of thermally conductive putty 51 and 52.

These blocks of thermally conductive putty 51 and 52 are each of a predetermined thickness which is linked to the thickness of the memory module 4 in order for the assembly to be sandwiched between the two plates 21, with a satisfactory degree of compression of those blocks 51 and 52.

Figure 4:
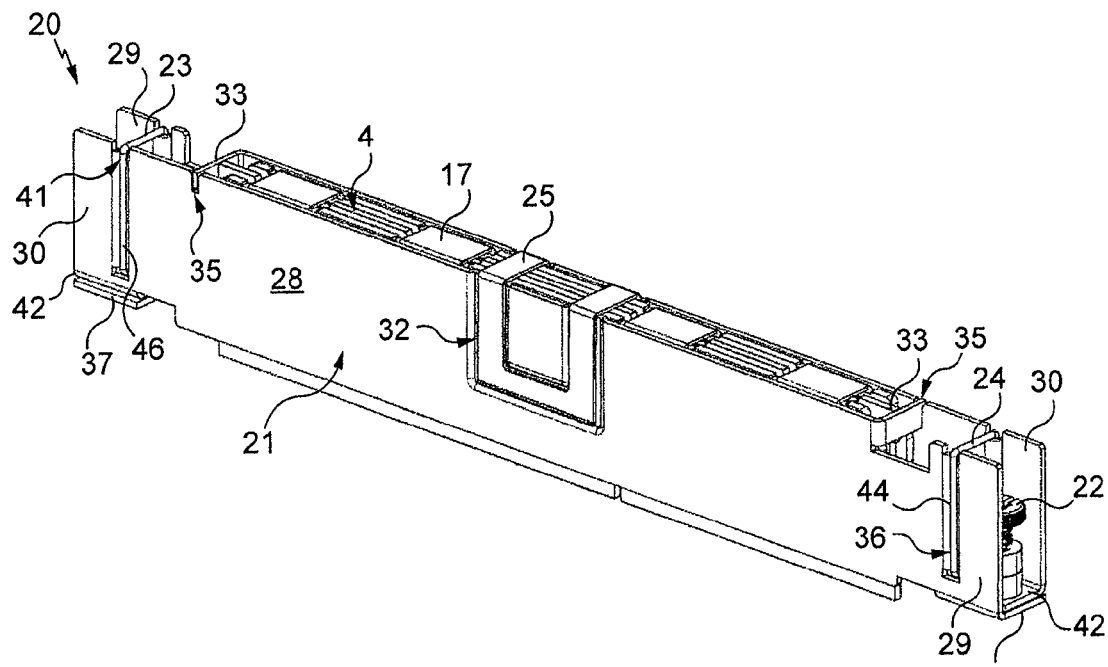

In this position, illustrated in FIG. 4, the ends of the protrusions 33 of each plate 21 are received in the respective slots of those plates 21 and the linking lugs 42 and 37 are superposed in relation to each other, each lug 42 being located above each lug 37 in a position in which the projections 44 of the lugs 42 come into abutment against a lateral edge of a respective lug 37 in order to ensure the alignment of the respective apertures 39 and 43.

The cooperation between the slots 35 and the protrusions 33 enables a space to be formed of which the contour is delimited by those protrusions 33 and the portions 28 of each plate 21, thereby ensuring that the memory module 4 has predetermined positioning and is well held in that space.

Also in that position, the circlips 23 and 24 are each assembled onto each of the plates 21 such that the branches 46 of the circlips 23 and 24 are inserted into the respective grooves 36 and 41 and that the tips 50 are introduced into the respective holes 45 and 68.

Thus, the second and third respective portions 29 and 30 are located opposite each other in pairs, are situated at a predetermined and constant distance from each other and the holding thereof is ensured.

The linking part 25 is also mounted on each of the plates 21 such that the U-shaped portions 48 are inserted into the respective deformations 32 of the plates 21, and with the portions 49 of that linking part 25 being placed on an upper edge of the memory module 4, thus holding it inside the space whose contour is delimited.

The U-shaped portions 48 furthermore facilitate the holding under compression of the respective blocks of thermally conductive putty 51 and 52 sandwiched between the memory module 4 and the plates 21, in order to ensure an optimum heat transfer from the memory module 4 to the metal plates 21 via the blocks of thermally conductive putty 51 and 52.

In the assembled state, the constant spacing between the two heat transfer plates 21 is ensured both by the protrusions 33, the circlips 23 and 24 and the linking part 25.

In this assembled state, the fastening screws 22 are inserted between the respective second and third portions 29 and 30.

It can also be seen in this assembled state that the two heat transfer plates 21, which are identical, are of predetermined height somewhat less than, or equal to, the height of the memory module 4.

FIGS. 5 and 6 illustrate the computer board, seen partially in plan view, respectively without the memory module 4 and its associated heat sink 20 and with the memory module 4 and its associated heat sink 20.

In FIG. 5 members 53 for snap engaging the memory module 4 to the printed circuit 2 are illustrated, these members 53 cooperating with the retaining means 14 formed on the memory module 4 once that module has been electrically connected via its electrical connector 13 which are inserted into the electrical connector 12 of the printed circuit 2.

For its assembly, the assembly formed by the memory module 4 and the heat sink 20 associated with that module 4 is inserted into the opening 10 illustrated in FIG. 5.

Once the memory module has been electrically connected, the linking lugs 37 of each heat transfer plate 21 are located placed against the cold plate 3, with or without an additional block of thermally conductive putty (not shown) between them to further promote the transfer of heat.

The assembly formed by the heat sink 20 and the associated memory module 4 is then fastened to that cold plate 3 via each shank coming from each fastening screw 22. If there is an additional block of thermally conductive putty sandwiched between each linking lug 37 and the cold plate 3, that additional block is holed in its center for the passage of the shank of the fastening screw 22.

The same assembly composed of a heat sink 20 and a memory module 4 is formed and the same fastening is carried out for the sixteen memory modules 4 visible in FIG. 1, each of those assemblies having a constant length and thickness, in other words an identical bulk.

Figure 7:
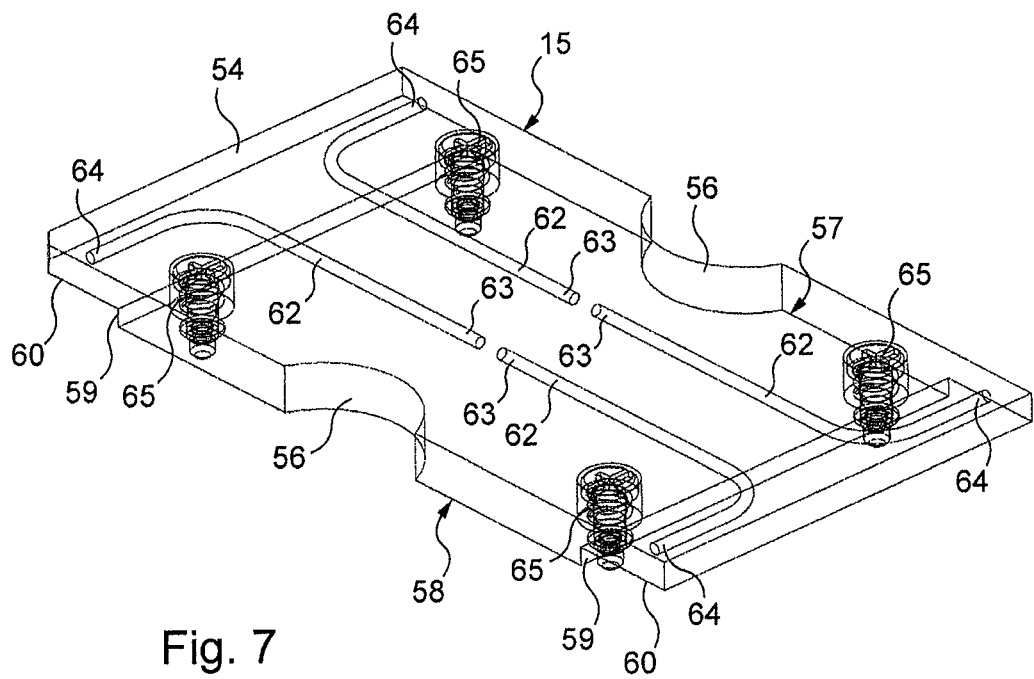
FIG. 7 is an isolated perspective view of a heat sink dedicated to a processor connected to the computer board.

FIGS. 7 and 8 respectively show a heat sink 15 dedicated to the processor 55, in isolation, and the computer board 1, without any memory module or any heat sink associated with that memory module, but with the processor 55 mounted on the printed circuit 2, partially surrounded by the cold plate 3 and associated with its heat sink 15.

The processor 55 is inserted into the opening 11 created in the cold plate 3.

This processor 55 comprises an electrical connector (not shown) adapted to be connected to another electrical connector of the board 1 (not shown). This processor 55 heats up in operation and thus has a heat exchange surface 69 on the top.

The heat sink 15 dedicated to that processor 55 is mounted on top of that processor 55, on its heat exchange surface 69, and is entirely received within the opening 11 until it is flush with the upper face of the cold plate 3.

This heat sink 15 comprises a metal plate 54 of substantially parallelepiped and rectangular shape. The cut-outs 56 are formed on two long sides of the plate 54 for it to be grasped.

Furthermore, that plate 54 has an upper face 57 and a lower face 58, which lower face 58 is provided with two re-entrant portions 59 forming lower edges 60 adapted to be placed against walls 61 of the cold plate 3.

The plate 54 further comprises four heat pipes 62 mounted inside that plate 54, which heat pipes 62 are disposed in the plate 54 such that they each have an end 63 situated rather in the center of that plate 54, in other words at the location of the hot part of the processor 55, and another end 64, which is an opposite end to the end 63, each at the location of a corner of the plate 54, in other words in the vicinity of the cold plate 3.

Thus, the respective ends 63 of the heat pipes 62 are adapted to capture the heat produced by the processor 55 associated with the heat sink 15, which heat is transferred to each respective end 64 of the respective heat pipe 62 to transfer that heat towards the cold plate 3.

The heat sink 15 further comprises four fastening means 65 formed by well-known spring screws (close to those used for the heat sink 20), these means 65 being directly fastened to a support of the processor 55, which support is placed on the printed circuit 2.

FIGS. 9 and 10 illustrate a second embodiment of the heat sink according to the invention.

Generally, for similar parts the same references have been used, but to which the number 100 has been added.

Contrary to the assembly formed by the heat sink 20 and the memory module 4 illustrated in FIGS. 1 to 8, the memory module 104 illustrated in FIGS. 9 and 10 is bare, that is to say lacking any integrated air-cooled heat sink. This memory module 104 has electronic components 170 on both sides of its circuit 116 thus forming two opposite thermal exchange surfaces 118 and 119.

Here the memory module 104 is of smaller thickness than that of the memory module 4.

The heat sink 120 comprises metal heat transfer plates 121 of copper which are in every respect identical to the metal heat transfer plates 21 of the first embodiment.

This heat sink 120 further comprises linking parts 123, 124 and 125 which are in every respect identical to the linking parts 23, 24 and 25 illustrated in FIGS. 1 to 8.

Thus, the respective bulks of the heat sinks 20 and 120 are identical, and, in particular the distance between two respective heat transfer plates 21 and 121, in other words their spacing, is identical when the assembly formed by those respective heat sinks 20 and 121 and by the respective memory modules 4 and 104 is assembled, as can be seen respectively in FIGS. 4 and 10.

The heat sink 120 comprises a thermal interface formed by a single block of thermally conductive putty 180, which block 180 is of greater thickness than the blocks of thermally conductive putty 51 and 52 illustrated in FIG. 3, this being in order to compensate for the difference in thickness of the memory module 104 relative to the memory module 4.

Of course, the thermal interface 180 may be formed from several blocks.

Like the blocks of thermally conductive paste 51 and 52 illustrated in FIG. 3, the block of thermally conductive paste 180 illustrated in FIG. 9 is relatively flexible so as to enable high compression between the respective inside faces 127 of two plates 121 and the respective thermal exchange surfaces 118 and 119.

Identically to the heat sink 20 illustrated in FIGS. 1 to 8, the heat sink 120 further comprises fastening means 122 formed by spring fastening screws.

The assembly formed by the heat sink 120 and the memory module 104 is, like the assembly formed by the heat sink 20 and the memory module 4, adapted to be mounted on a computer board (not shown) similar to the computer board 1 illustrated in FIG. 1.

The assembly of the heat sink 120 and of the memory module 104 is achieved in the same way as the assembly of the heat sink 20 with the memory module 4.

Furthermore, the assembly of the memory module 104 and of the device 120 on the computer board, and in particular on the cold plate, is carried out in the same way as in the first embodiment.

In variants that are not illustrated:
the heat transfer plates are of a material other than copper, for example of aluminum;
instead of being in the form of putty, the thermal interfaces are in the form of grease;
these thermal interfaces have standard shapes and sizes adapted to be used for different types of memory modules. For example, these thermal interfaces are of substantially rectangular general shape, with a thickness varying for example from approximately 1 mm to approximately 3 mm, and the allowable degree of compression for those thermal interfaces is of the order of approximately 1% to approximately 55% once sandwiched between the heat transfer plates and the memory modules.

In still another variant not illustrated, the heat sink sandwiches several memory modules, there being or not being a thermal interface interposed between each memory module, depending on whether the memory module has one or two heat exchange surfaces (that is to say depending on whether it comprises electronic components on one or two faces). For example, the heat sink comprises in particular two heat-transfer devices sandwiching two or more memory modules, each having electronic components on a single face, and consequently each having a single heat exchange surface, those two or more modules being arranged "head-to-tail" relative to each other and without any thermal interface interposed between them. For example again, the heat sink comprises in particular two heat-transfer devices sandwiching two memory modules, or more, each having electronic components on two faces, and consequently each having two thermal exchange surfaces, two additional thermal interfaces interposed between the two modules, each of those additional interfaces being placed against an exchange surface of a respective module, and at least one intermediate heat transfer plate interposed between those two additional thermal interfaces, that intermediate plate being linked to at least one of the two heat-transfer devices to be in thermal contact with the cold plate.

In still another variant not illustrated, the computer board comprises an input/output interface for example such as a network board instead of or in addition to an interchangeable extension module and a heat sink that is configured to be associated with that input/output interface.

It should be noted more generally that the invention is not limited to the examples described and represented.

The invention claimed is:

1. A heat sink for an interchangeable expansion module able to be connected to a computer board, the board having at least one cooling module in which passes a cooling fluid and at least one first electrical connector, the expansion module having at least one second electrical connector configured to be connected to the at least one first electrical connector of the board and at least one heat exchange surface, wherein the heat sink comprises at least one heat-transfer device configured to be placed removably against the exchange surface of the expansion module, which at least one heat-transfer device is furthermore configured such that it is in thermal contact with the cooling module of the board and is removably fastened mechanically to the cooling module of the board, with a fastener that extends through an aperture formed in a portion of the at least one heat-transfer device to attach the portion of the at least one heat-transfer device to the cooling module, when the expansion module is connected to the board.

2. A heat sink according to claim 1, further comprising a thermal interface sandwiched between the heat-transfer device and the heat exchange surface of the expansion module.

3. A heat sink according to claim 1, comprising two of the heat-transfer devices configured to sandwich at least one said interchangeable expansion module, one of the two said heat-transfer devices being configured to be removably placed against said exchange surface of said at least one expansion module or in thermal contact with the cooling module of the board and removably fastened mechanically to the board when the at least one expansion module is connected to the board, and the other of the two said heat-transfer devices being configured to be in thermal contact with the cooling module of the board and removably fastened mechanically to the board when the at least one expansion module is connected to the board or removably placed against said exchange surface of a said at least one expansion module.

4. A heat sink according to claim 1, comprising two said heat-transfer devices and linking parts configured such that the two said heat-transfer devices are situated at a predetermined constant distance from each other.

5. A heat sink according to claim 1, wherein the at least one heat-transfer device is of a predetermined height less than or equal to the height of the extension module.

6. A heat sink according to claim 1, comprising two said heat-transfer devices and positioning means configured to form a space adapted to receive at least one said expansion module, the space having a delimited contour formed at least partially by the two said heat-transfer devices and by the positioning means.

7. A heat sink according to claim 1, comprising two said heat-transfer devices configured to be arranged facing each other, which said two heat-transfer devices are identical.

8. A heat sink according to claim 1, comprising two said heat-transfer devices each provided with at least one linking lug, which linking lugs are configured to be linked together, in thermal contact with the cooling module and removably fastened mechanically together to the computer board when the at least one expansion module is connected to the board, at least one of the linking lugs being configured to be placed against the cooling module.

9. A computer board comprising at least one cooling module in which passes a cooling fluid, at least one first electrical connector, at least one interchangeable expansion module having at least one second electrical connector configured to be connected to the at least one first electrical connector of the board, and at least one heat sink according to claim 1.

10. A board according to claim 9, comprising at least one third electrical connector, at least one processor having at least one fourth electrical connector configured to be connected to the at least one third electrical connector of the board and at least one heat exchange surface, and at least one other heat sink dedicated to the at least one processor, the at least one other heat sink being configured to be at the same time placed removably against the heat exchange surface of the processor, in thermal contact with the cooling module and removably fastened mechanically to the board when the at least one processor is connected to the board.

11. A heat sink according to claim 1, wherein the fastener is a screw.

12. A heat sink according to claim 6, wherein the positioning means includes a protrusion arranged on one of the two said heat-transfer devices.

13. A heat sink according to claim 1, wherein the portion of the at least one heat-transfer device is a linking lug.

14. A heat sink according to claim 1, wherein the at least one heat-transfer device includes a plate to be placed removably against the exchange surface of the expansion module along a length of the expansion module.

15. A heat sink according to claim 1, wherein the portion of the at least one heat-transfer device is a linking lug that is connected to the plate.

16. A heat sink according to claim 15, wherein the linking lug extends perpendicularly to the plate.

17. A heat sink for an interchangeable expansion module able to be connected to a computer board, the board having at least one cooling module in which passes a cooling fluid and at least one first electrical connector, the expansion module having at least one second electrical connector configured to be connected to the at least one first electrical connector of the board and at least one heat exchange surface, wherein the heat sink comprises at least one heat-transfer device configured to be placed removably against the exchange surface of the expansion module, which at least one heat-transfer device is furthermore configured such that it is in thermal contact with the cooling module of the board and is removably fastened mechanically to the cooling module of the board, with a fastener that attaches a portion of the at least one heat-transfer device to the cooling module, when the expansion module is connected to the board, wherein the heat sink comprises two said heat-transfer devices each provided with at least one linking lug, which linking lugs are configured to be linked together using the fastener, in thermal contact with the cooling module and removably fastened mechanically together to the computer board when the at least one expansion module is connected to the board, at least one of the linking lugs being configured to be placed against the cooling module.

* * * * *